US010904409B2

(12) United States Patent
Sawada

(10) Patent No.: US 10,904,409 B2
(45) Date of Patent: Jan. 26, 2021

(54) DETECTION APPARATUS, IMAGING APPARATUS, MOVEABLE BODY, AND DETECTION METHOD

(71) Applicant: KYOCERA Corporation, Kyoto (JP)

(72) Inventor: Ryuichi Sawada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 25 days.

(21) Appl. No.: 16/319,873

(22) PCT Filed: Jul. 14, 2017

(86) PCT No.: PCT/JP2017/025790
§ 371 (c)(1),
(2) Date: Jan. 23, 2019

(87) PCT Pub. No.: WO2018/021076
PCT Pub. Date: Feb. 1, 2018

(65) Prior Publication Data
US 2019/0253584 A1    Aug. 15, 2019

(30) Foreign Application Priority Data

Jul. 27, 2016  (JP) ................................. 2016-147892

(51) Int. Cl.
| | | |
|---|---|---|
| *H04N 5/217* | (2011.01) | |
| *H04N 7/18* | (2006.01) | |
| *H04N 5/225* | (2006.01) | |
| *H04N 5/232* | (2006.01) | |
| *G01N 21/90* | (2006.01) | |
| *G06K 9/00* | (2006.01) | |
| *G06T 7/00* | (2017.01) | |

(52) U.S. Cl.
CPC ....... *H04N 5/2171* (2013.01); *G01N 21/9009* (2013.01); *G06K 9/00805* (2013.01); *G06T 7/0004* (2013.01); *H04N 5/225* (2013.01); *H04N 5/232* (2013.01); *H04N 7/18* (2013.01); *G06T 2207/30248* (2013.01)

(58) Field of Classification Search
None
See application file for complete search history.

(56) References Cited

U.S. PATENT DOCUMENTS

| | | |
|---|---|---|
| 8,373,902 B2 | 2/2013 | Takikawa et al. |
| 9,813,593 B2 | 11/2017 | Akiyama et al. |
| 2009/0185756 A1 | 7/2009 | Toyoda et al. |
| 2009/0317016 A1* | 12/2009 | Cho ........................ G06T 5/50 |
| | | 382/264 |

(Continued)

FOREIGN PATENT DOCUMENTS

| | | |
|---|---|---|
| JP | H09-172641 A | 6/1997 |
| JP | 2008-219147 A | 9/2008 |

(Continued)

*Primary Examiner* — Kaitlin A Retallick
(74) *Attorney, Agent, or Firm* — Studebaker & Brackett PC

(57) ABSTRACT

A detection apparatus includes an image acquisition interface that acquires a captured image captured by an imaging unit and a controller that generates or acquires a smoothed image yielded by smoothing the captured image. The controller compares the captured image and the smoothed image and detects a low-frequency region having a predetermined spatial frequency spectrum from the captured image.

13 Claims, 13 Drawing Sheets

(56) References Cited

U.S. PATENT DOCUMENTS

| | | | |
|---|---|---|---|
| 2012/0154601 A1* | 6/2012 | Ferguson | H04N 17/00 348/180 |
| 2015/0139566 A1 | 5/2015 | Nakamura | |
| 2015/0201120 A1* | 7/2015 | Irie | G06K 9/00825 348/148 |
| 2016/0165101 A1* | 6/2016 | Akiyama | G06T 7/42 348/187 |

FOREIGN PATENT DOCUMENTS

| | | |
|---|---|---|
| JP | 2009-130700 A | 6/2009 |
| JP | 2015-026987 A | 2/2015 |
| WO | 2014/017602 A1 | 1/2014 |

* cited by examiner

DETECTION APPARATUS, IMAGING APPARATUS, MOVEABLE BODY, AND DETECTION METHOD

CROSS-REFERENCE TO RELATED APPLICATION

The present application claims priority to and the benefit of Japanese Patent Application No. 2016-147892 filed Jul. 27, 2016, the entire contents of which are incorporated herein by reference.

TECHNICAL FIELD

The present disclosure relates to a detection apparatus, an imaging apparatus, a moveable body, and a detection method.

BACKGROUND

An image captured by a camera can be thought of as a combined wave in which a plurality of waves overlap. The image can be expressed as a spatial frequency spectrum by spatial frequency analysis. A configuration is known for detecting a foreign substance, such as dirt or a water droplet, on the lens surface of the camera on the basis of the spatial frequency spectrum. For example, see patent literature (PTL) 1.

SUMMARY

A detection apparatus according to an embodiment of the present disclosure includes an image acquisition interface that acquires a captured image captured by an imaging unit and a controller that generates or acquires a smoothed image yielded by smoothing the captured image. The controller compares the captured image and the smoothed image and detects a low-frequency region having a predetermined spatial frequency spectrum from the captured image.

An imaging apparatus according to an embodiment of the present disclosure includes an imaging unit that includes an imaging optical system and an image sensor that performs photoelectric conversion on a subject image formed by the imaging optical system. The imaging apparatus includes an image acquisition interface that acquires a captured image from the image sensor and a controller that smooths the captured image to acquire a smoothed image. The controller compares the captured image and the smoothed image and detects a low-frequency region having a predetermined spatial frequency spectrum from the captured image.

A moveable body according to an embodiment of the present disclosure includes an imaging apparatus. The imaging apparatus includes an imaging unit that includes an imaging optical system and an image sensor that performs photoelectric conversion on a subject image formed by the imaging optical system. The imaging apparatus includes an image acquisition interface that acquires a captured image from the image sensor and a controller that smooths the captured image to acquire a smoothed image. The controller compares the captured image and the smoothed image and detects a low-frequency region having a predetermined spatial frequency spectrum from the captured image.

A detection method according to an embodiment of the present disclosure includes acquiring a captured image captured through an imaging optical system. The detection method includes acquiring a smoothed image yielded by smoothing the captured image. The detection method includes comparing the captured image and the smoothed image and detecting a low-frequency region having a predetermined spatial frequency spectrum from the captured image.

DETAILED DESCRIPTION

Spatial frequency analysis of an image can be performed by a Fourier transform, for example. The image processing for spatial frequency analysis is computationally complex and may place a large load on the apparatus. In other words, the processing to use spatial frequency analysis for detecting a region having a predetermined spatial frequency spectrum from an image could represent a large load for the apparatus.

The detection apparatus and imaging apparatus according to the present disclosure may be mounted on a moveable body. The term "moveable body" in the present disclosure includes vehicles, ships, and aircraft. The term "vehicle" in the present disclosure includes, but is not limited to, automobiles and industrial vehicles and may also include railway vehicles, vehicles for daily life, and aircraft that run on a runway. Examples of automobiles include, but are not limited to, passenger vehicles, trucks, buses, motorcycles, and trolley buses, and may include other vehicles that travel on the road. Industrial vehicles include industrial vehicles for agriculture and for construction. Industrial vehicles include, but are not limited to, forklifts and golf carts. Industrial vehicles for agriculture include, but are not limited to, tractors, cultivators, transplanters, binders, combines, and lawnmowers. Industrial vehicles for construction include, but are not limited to, bulldozers, scrapers, backhoes, cranes, dump cars, and road rollers. The term "vehicle"

includes human-powered vehicles. The vehicle is not limited to the above-listed types. For example, automobiles may include industrial vehicles that can be driven on the road. The same vehicle may also be included in multiple categories. The term "ship" in the present disclosure includes marine jets, boats, and tankers. The term "aircraft" in the present disclosure includes fixed-wing aircraft and rotorcraft.

The detection apparatus and imaging apparatus according to the present disclosure may be mounted on a mobile terminal, a handheld terminal, or the like. The detection apparatus and imaging apparatus according to the present disclosure may be mounted on a stationary apparatus. The detection apparatus and imaging apparatus according to the present disclosure may be used independently as a stationary apparatus, a mobile apparatus, or the like.

Figure 1:
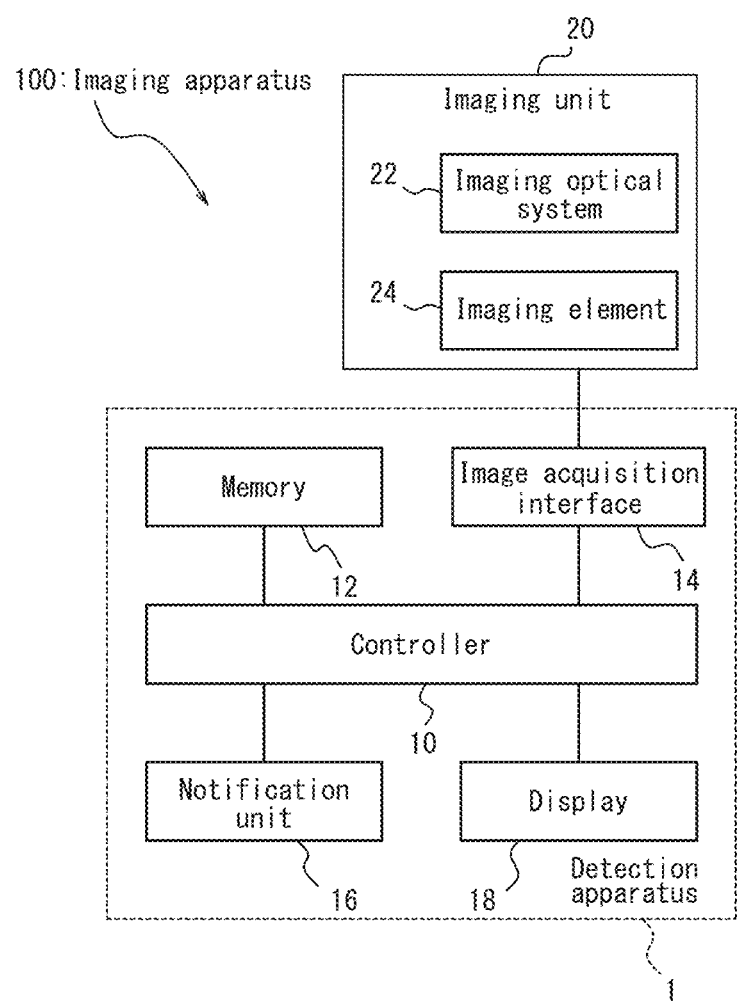
FIG. 1 is a block diagram schematically illustrating an example configuration of an imaging apparatus according to an embodiment.

As illustrated in FIG. 1, an imaging apparatus 100 according to an embodiment includes a detection apparatus 1 and an imaging unit 20. The detection apparatus 1 includes a controller 10, a memory 12, an image acquisition interface 14, a notification interface 16, and a display 18. The imaging unit 20 includes an imaging optical system 22 and an image sensor 24.

The controller 10 controls each component of the detection apparatus 1. The controller 10 may, for example, be configured by a processor or microcomputer capable of executing application software. The controller 10 may include a storage device storing various information, programs for operating the components of the detection apparatus 1, and the like. The storage device may, for example, be a semiconductor memory. The storage device may function as a working memory of the controller 10. The controller 10 may use the memory 12 as the storage device.

The controller 10 may include a communication device for communicating with the components of the detection apparatus 1. The communication device may, for example, be a communication interface for a local area network (LAN), a control area network (CAN), or the like. The detection apparatus 1 may include the communication device as a communication interface. The controller 10 may connect to an external apparatus using the communication device. The controller 10 may acquire various information, display image data, or the like from an external apparatus. The communication device may be capable of communicating with the components of the detection apparatus 1 or an external apparatus in a wired or wireless manner.

Through the image acquisition interface 14, the controller 10 may acquire an image captured by the imaging unit 20. The image captured by the imaging unit 20 is also referred to as a captured image 110 (see FIG. 3). The controller 10 may smooth the captured image 110. The smoothed captured image 110 is also referred to as a smoothed image. In other words, the controller 10 may generate or acquire a smoothed image on the basis of the captured image 110. The controller 10 can compare the captured image 110 and the smoothed image and detect whether the captured image 110 has a predetermined spatial frequency spectrum. In other words, the controller 10 can detect whether the captured image 110 has a predetermined spatial frequency spectrum on the basis of the captured image 110 and the smoothed image. The controller 10 may detect the adherence of a foreign substance, such as dirt or a water droplet, on the imaging unit 20 on the basis of the captured image 110 and the smoothed image. The controller 10 may, for example, detect the existence of another moveable body, a pedestrian, or the like on the basis of the captured image 110. The result of detection by the controller 10 on the basis of at least the captured image 110 is also referred to as the detection result. The controller 10 may output notification content to the notification interface 16 on the basis of the detection result. The controller 10 may output the captured image 110 to the display 18. The controller 10 may output an image yielded by processing the captured image 110 to the display 18. The controller 10 may output, to the display 18, an image yielded by overlaying display content that is based on the detection result onto the captured image 110. The display content based on the detection result may, for example, be a mark, a graphic such as an arrow, or characters.

The memory 12 stores information or parameters pertaining to operations of the detection apparatus 1. The memory 12 may, for example, be a semiconductor memory. The memory 12 may function as a working memory of the controller 10. The memory 12 may store the captured image 110. The memory 12 may store various parameters and the like for the controller 10 to perform detection processing on the captured image 110.

The image acquisition interface 14 connects to the imaging unit 20 and acquires the captured image 110 from the imaging unit 20. The image acquisition interface 14 outputs the captured image 110 to the controller 10. The image acquisition interface 14 may process the captured image 110 with a variety of methods, such as luminance adjustment or contrast adjustment.

The notification interface 16 notifies a user or nearby people of the notification content acquired from the controller 10. The notification interface 16 may, for example, include a liquid crystal, organic electro-luminescence (EL), inorganic EL, or light emission diode (LED) display device. The notification interface 16 may display the notification content acquired from the controller 10 on a display device. The notification interface 16 may include a device that emits audio and may emit audio on the basis of the notification content acquired from the controller 10. The notification interface 16 may include a device that generates vibration and may generate vibration on the basis of the notification content acquired from the controller 10. The notification interface 16 may provide notification based on the notification content with any humanly recognizable method other than audio or vibration.

The display 18 includes a liquid crystal, organic EL, inorganic EL, etc. display device. The display 18 displays the captured image 110, or the image yielded by processing the captured image 110, that is acquired from the controller 10.

The imaging unit 20 forms light incident on the imaging optical system 22 into an image with the image sensor 24 and acquires the image as the captured image 110. The imaging optical system 22 is formed by lenses, mirrors, or the like and forms light incident from a subject into a subject image at the imaging surface of the image sensor 24. The image sensor 24 may, for example, be a complementary metal oxide semiconductor (CMOS) image sensor, a charge coupled device (CCD) image sensor, or the like. The image sensor 24 performs photoelectric conversion on the subject image formed by the imaging optical system 22. The image sensor 24 calculates the electric signal obtained by photoelectric conversion as a luminance value of each pixel in accordance with a predetermined imaging gain. The image sensor 24 outputs the captured image 110, which includes information pertaining to the calculated luminance value of each pixel. The imaging gain is a coefficient for converting the light intensities detected by the image sensor 24 into luminance values of the captured image 110. For example, when the light intensities detected by the image sensor 24 overall are low, the image sensor 24 may increase the imaging gain to raise the luminance values of the captured image 110. Conversely, when the light intensities detected by the image sensor 24 overall are high, the image sensor 24 may decrease the imaging gain to lower the luminance values of the captured image 110.

Figure 2:
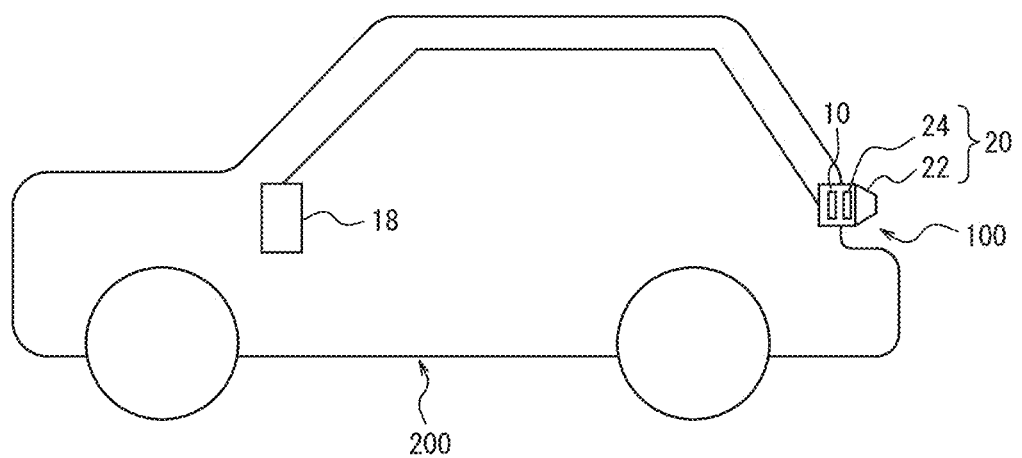
FIG. 2 illustrates an example of a moveable body in which the imaging apparatus of FIG. 1 is mounted.

As illustrated in FIG. 2, the imaging apparatus 100 may be mounted in a moveable body 200. In the example in FIG. 2, the imaging unit 20 is installed in the rear portion of the moveable body 200. The controller 10 of the detection apparatus 1 may be positioned along with the imaging unit 20. The display 18 of the detection apparatus 1 is assumed to be installed in the inside front of the moveable body 200. The display 18 connects to the imaging unit 20 by wiring inside the moveable body 200. The display 18 may connect over a communication interface such as a LAN or CAN. The display 18 may connect to the imaging unit 20 in a wired or wireless manner. The display 18 can acquire the captured image 110 of the area in front of the moveable body 200, an image generated by the controller 10, or an image resulting from the controller 10 processing the captured image 110.

The captured image 110 can be thought of as a combined wave in which a plurality of waves of different spatial frequencies overlap. The captured image 110 can be expressed as a spatial frequency spectrum indicating the wave intensity for each spatial frequency. The spatial frequency spectrum can be calculated by spatial frequency analysis, such as a Fourier transform. The spatial frequency spectrum can be calculated for a partial region of the captured image 110 instead of for the entire captured image 110. The spatial frequency spectrum can be calculated for at least a partial region of the captured image 110.

A wave of any spatial frequency constituting the spatial frequency spectrum is also referred to as a frequency component. A wave having a frequency of a predetermined spatial frequency or higher is also referred to as a high-frequency component. A wave having a frequency of less than a predetermined spatial frequency is also referred to as a low-frequency component. The predetermined spatial frequency is also referred to simply as a predetermined frequency. The predetermined frequency may be selected appropriately. The characteristics of the spatial frequency spectrum are indicated by the intensity of each frequency component. A spatial frequency spectrum representing an image in which the luminance changes steeply can include a high-frequency component at a relatively high intensity. A spatial frequency spectrum representing an image in which the luminance changes gradually can include a low-frequency component at a relatively high intensity.

Figure 3:
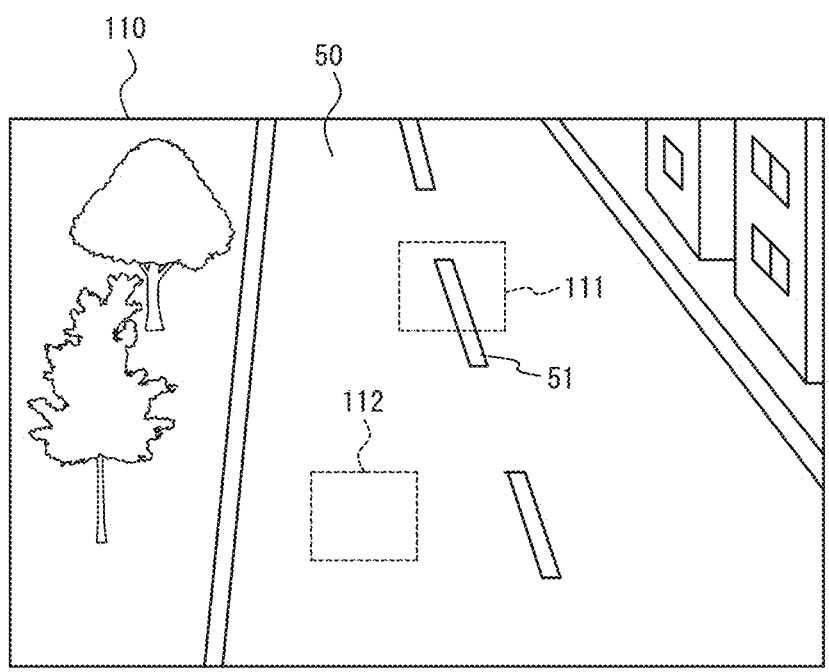
FIG. 3 schematically illustrates an example captured image.
Figure 4:
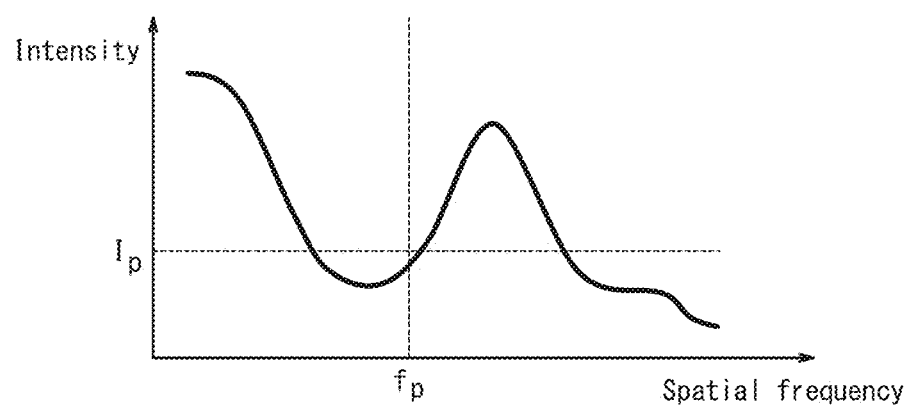
FIG. 4 is a graph illustrating an example spatial frequency spectrum in a first region of FIG. 3.
Figure 5:
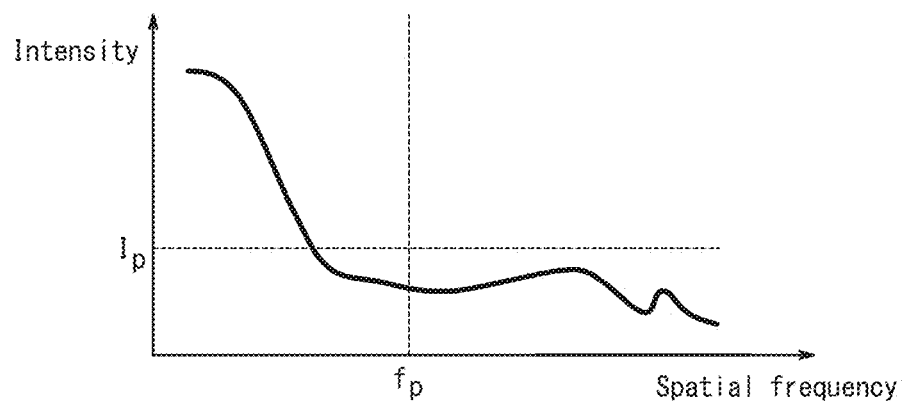
FIG. 5 is a graph illustrating an example spatial frequency spectrum in a second region of FIG. 3.

For example, in the captured image 110 illustrated in FIG. 3, a first region 111 including a centerline 51 drawn on a road 50 constitutes an image in which the luminance undergoes a relatively large change. As illustrated in FIG. 4, the spatial frequency spectrum of the first region 111 includes a high-frequency component at a relatively high intensity. On the other hand, a second region 112 that includes the road 50 but does not include the centerline 51 constitutes an image in which the luminance undergoes a relatively small change. As illustrated in FIG. 5, the spatial frequency spectrum of the second region 112 includes a low-frequency component at a relatively high intensity.

If a foreign substance is adhered to the imaging optical system 22 at the time that the imaging unit 20 acquires the captured image 110, then a portion of the captured image 110 may be affected by the foreign substance. The foreign substance may, for example, be dirt or a water droplet. By deviating from the focal point of the imaging optical system 22, the foreign substance adhered to the imaging optical system 22 may be reflected in the captured image 110 as a blurred outline in which the luminance undergoes a relatively small change. A water drop adhered to the imaging optical system 22 can scatter light incident on the imaging optical system 22. Consequently, the region of the captured image 110 corresponding to the portion where the water drop is adhered may become a region in which the luminance undergoes a relatively small change due to scattering of light.

Figure 6:
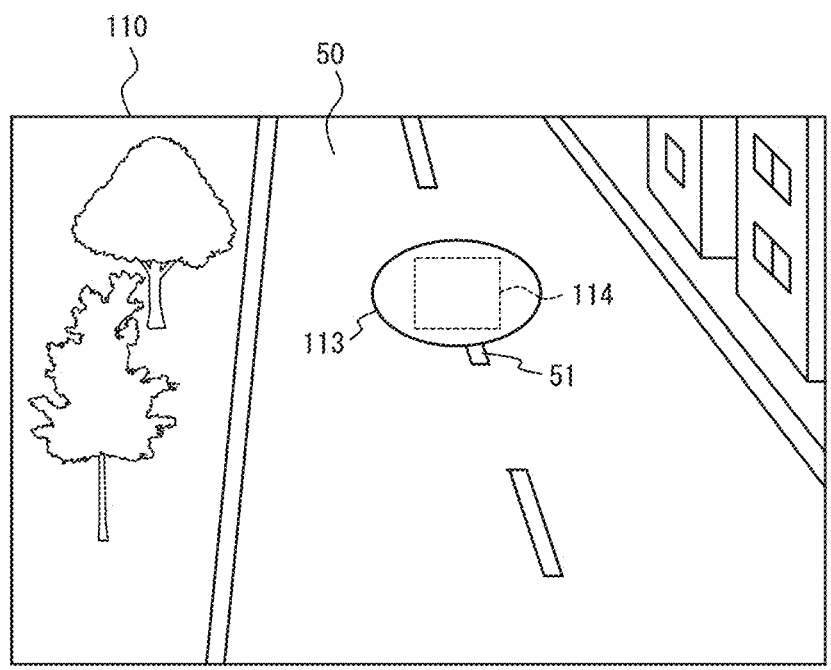
FIG. 6 schematically illustrates an example captured image affected by an adhered foreign substance.

For example, as illustrated in FIG. 6, a third region 113 that is affected by a foreign substance may become a region in which the luminance undergoes a relatively small change. The region affected by a foreign substance adhered to the imaging optical system 22 is also referred to as a foreign substance adherence region. A fourth region 114 that indicates the same region as the first region 111 of FIG. 3 is included in the third region 113, which is a foreign substance adherence region. Due to the effect of the foreign substance, the fourth region 114 does not include the image of the centerline 51, which should actually be present. The fourth region 114 is a region with a relatively small change in luminance as compared to the first region 111 of FIG. 3, which is not affected by a foreign substance. The spatial frequency spectrum of the fourth region 114 has a low-frequency component at a relatively high intensity, similar to FIG. 5. In other words, the spatial frequency spectrum of the foreign substance adherence region in the captured image 110 can have a low-frequency component at a relatively higher intensity than in a region not affected by a foreign substance.

As illustrated in FIG. 3 through FIG. 6, the captured image 110 can include a region that has a spatial frequency spectrum including a high-frequency component at a relatively high intensity and a region that has a spatial frequency spectrum including a low-frequency component at a relatively high intensity. The controller 10 can detect a region having a predetermined spatial frequency spectrum on the basis of the captured image 110. The controller 10 may detect a region that has a spatial frequency spectrum including a low-frequency component at a relatively high intensity as a low-frequency region. The controller 10 may detect a region that has a spatial frequency spectrum including a high-frequency component at a relatively high intensity as a high-frequency region. The low-frequency region or the high-frequency region is assumed to be a predetermined region included in the captured image 110.

A low-frequency region may be defined as a region that has a spatial frequency spectrum in which the intensity of a frequency component of a predetermined frequency or higher is less than a predetermined intensity. In FIGS. 4 and 5, the predetermined frequency is fp, and the predetermined intensity is Ip. In the spatial frequency spectrum illustrated in FIG. 4, the intensity of at least a portion of the frequency component of the predetermined frequency or higher is the predetermined intensity or higher. According to the definition of a low-frequency region, the region having the spatial frequency spectrum illustrated in FIG. 4 is not a low-frequency region. In the spatial frequency spectrum illustrated in FIG. 5, the intensity of the frequency component of the predetermined frequency or higher is less than the predetermined intensity. According to the definition of a low-frequency region, the region having the spatial frequency spectrum illustrated in FIG. 5 is a low-frequency region.

The low-frequency region included in the captured image 110 may be detected by analyzing the spatial frequency spectrum of the captured image 110. However, the low-frequency region can also be detected without analyzing the spatial frequency spectrum. Using the procedures of the flowchart in FIG. 7, the controller 10 can detect a low-frequency region from the captured image 110 by judging whether a predetermined region of the captured image 110 is a low-frequency region.

Figure 8:
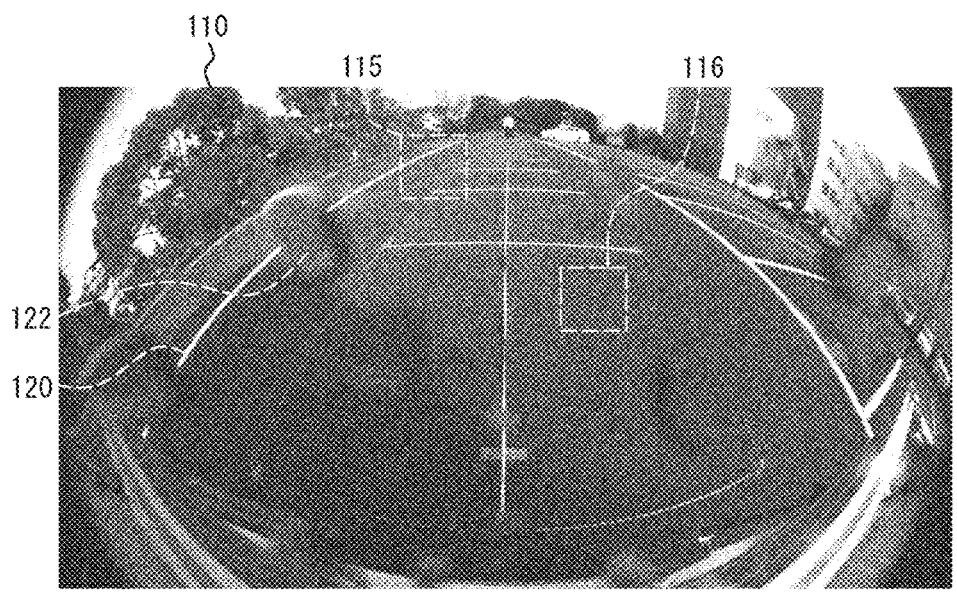
FIG. 8 illustrates an example captured image.

The controller 10 acquires the captured image 110 from the image acquisition interface 14 (step S1). As illustrated in FIG. 8, for example, the captured image 110 may be captured by the imaging unit 20 mounted in the moveable body 200. The captured image 110 of FIG. 8 includes a white line 120 drawn on the ground and a water droplet 122. The line 120 that should exist behind the image of the water droplet 122 cannot be distinguished due to the water droplet 122 and is cut off by the image of the water droplet 122. If the water droplet 122 did not exist, the line 120 would be connected in the captured image 110. The captured image 110 is assumed to include a fifth region 115 including the line 120 and a sixth region 116 not including the line 120. The fifth region 115 is a region that has a spatial frequency spectrum including a high-frequency component at a relatively high intensity. The sixth region 116 is a region that has a spatial frequency spectrum including a low-frequency component at a relatively high intensity. The controller 10 can determine the predetermined frequency so that the fifth region 115 is detected as a high-frequency region and the sixth region 116 is detected as a low-frequency region.

Figure 9:
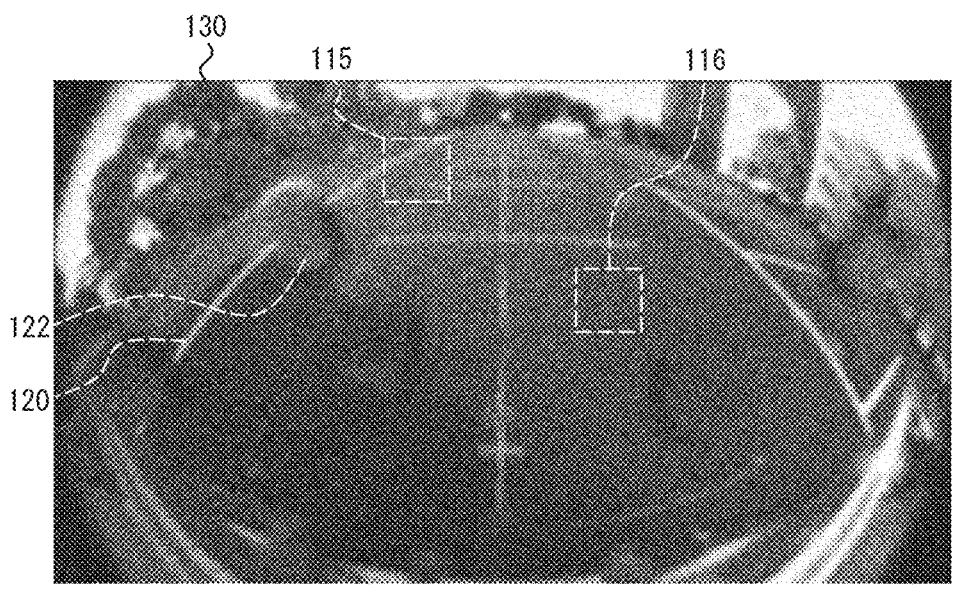
FIG. 9 illustrates an example smoothed image.

The controller 10 smooths the captured image 110 to generate a smoothed image 130 like the one in FIG. 9 (step S2). The controller 10 may cause the image acquisition interface 14 to smooth the captured image 110. The image can be smoothed by cutting of the high-frequency component included in the image. In other words, the image can be smoothed by a low pass filter being applied to the image. The image may, for example, be smoothed by a moving average being calculated for each pixel. The image may also be smoothed by application of a Gaussian filter to each pixel. The image may be smoothed by another method. A portion indicating the line 120 and a portion indicating the water droplet 122 can be distinguished in the smoothed image 130, as in the captured image 110 of FIG. 8. The fifth region 115 and the sixth region 116 may be provided in the smoothed image 130 in the same way as in the captured image 110 of FIG. 8.

The controller 10 compares the captured image 110 and the smoothed image 130 and judges whether a predetermined region of the captured image 110 is a low-frequency region to detect the low-frequency region from the captured image 110 (step S3). The controller 10 may detect a high-frequency region instead of a low-frequency region from the captured image 110. The controller 10 may detect a region having a predetermined spatial frequency spectrum from the captured image 110. In step S3, the controller 10 may execute the procedures of a subroutine that includes various procedures. The controller 10 may, for example, judge that a region with a small difference between the captured image 110 and the smoothed image 130 is a low-frequency region. After step S3, the controller 10 ends the procedures of the flowchart in FIG. 7.

Figure 7:
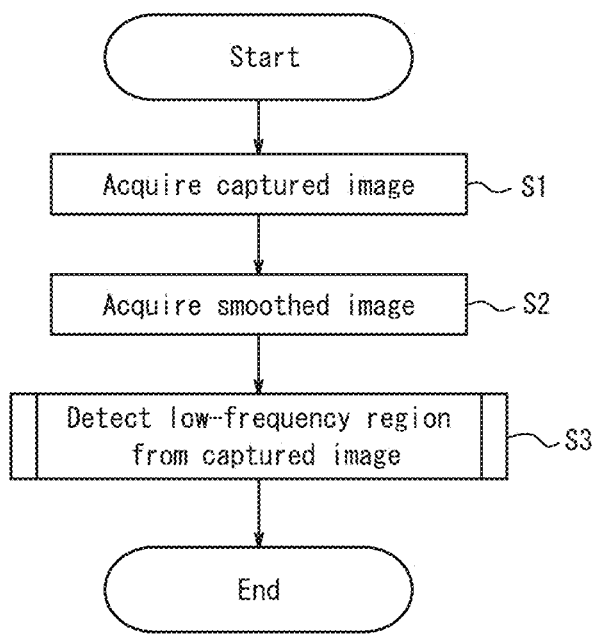
FIG. 7 is a flowchart illustrating an example of processing to detect a low-frequency region.
Figure 10:
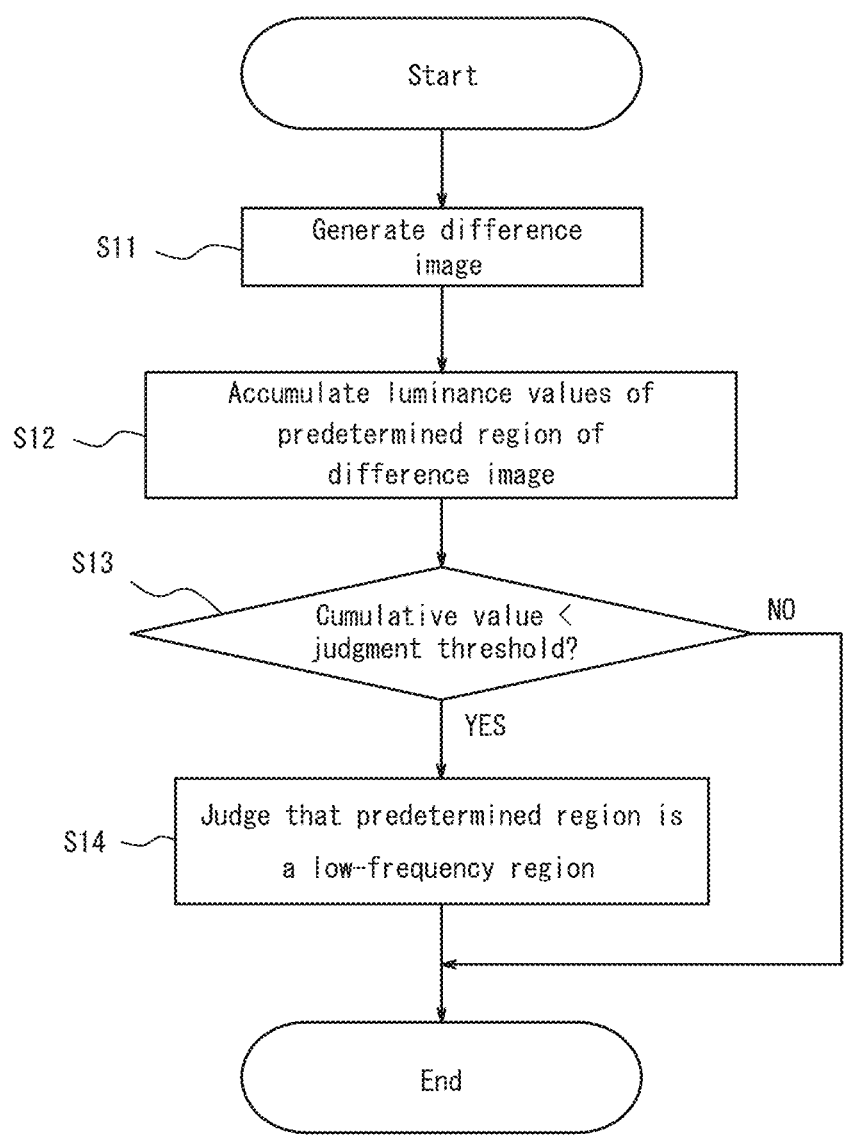
FIG. 10 is a flowchart illustrating an example of procedures for detecting a low-frequency region from a difference image.

In step S3 of FIG. 7, the controller 10 may execute the procedures of the flowchart in FIG. 10.

Figure 11:
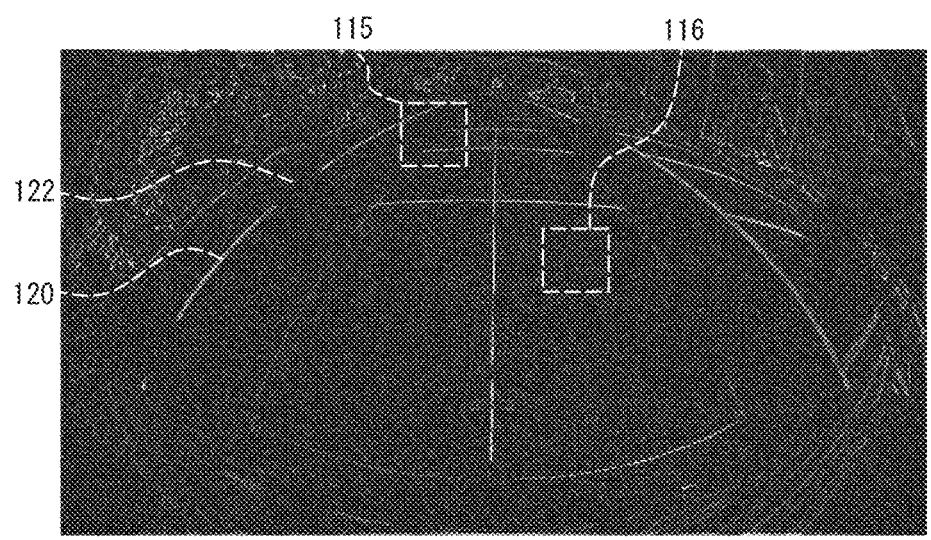
FIG. 11 illustrates an example difference image.

The controller 10 calculates the difference in the luminance value of each pixel between the captured image 110 and the smoothed image 130 to generate a difference image 140 like the one in FIG. 11 (step S11). The line 120 can be distinguished as a portion with a high luminance value in the difference image 140. The water droplet 122 can be distinguished as a portion with a low luminance value in the difference image 140. The line 120 is not distinguished in the portion corresponding to the image of the water droplet 122. The fifth region 115 and the sixth region 116 are assumed to be provided in the difference image 140 in the same way as in the captured image 110 of FIG. 8. According to the generation method of the difference image 140, pixels with a high luminance value among the pixels of the difference image 140 may correspond to pixels included in the high-frequency region of the captured image 110.

The fifth region 115 and the sixth region 116 may be provided in common across the captured image 110, the smoothed image 130, and the difference image 140. The fifth region 115 and the sixth region 116 may become regions corresponding to each other across the captured image 110, the smoothed image 130, and the difference image 140. In addition to the fifth region 115 and the sixth region 116, any other regions may be provided in common across the captured image 110, the smoothed image 130, and the difference image 140.

The controller 10 accumulates the luminance value of the pixels included in a predetermined region of the difference image 140 (step S12). For example, the fifth region 115 of the difference image 140 includes pixels indicating the line 120. The cumulative value of the luminance value of the pixels included in the fifth region 115 is the value yielded by accumulating the luminance value of the pixels indicating the line 120. On the other hand, the sixth region 116 of the difference image 140 does not include pixels with a high luminance value, such as pixels indicating the line 120. In this case, the cumulative value of the luminance value of the pixels included in the sixth region 116 is lower than the cumulative value of the luminance value of the pixels included in the fifth region 115.

The controller 10 judges whether the cumulative value of the luminance value of the pixels included in the predetermined region of the difference image 140 is less than a judgment threshold (step S13). The cumulative value of the luminance value of the pixels included in the predetermined region of the difference image 140 corresponds to the intensity of the high-frequency component included in the spatial frequency spectrum of the predetermined region of the captured image 110. For example, the intensity of the high-frequency component is higher as the cumulative value is greater. The judgment threshold may be determined appropriately. When the cumulative value of the luminance values is less than the judgment threshold (step S13: YES), the controller 10 judges that the predetermined region is a low-frequency region (step S14). For example, the sixth region 116 can be judged to be a low-frequency region if the cumulative value of the luminance values is relatively low. After step S14, the controller 10 ends the procedures of the flowchart in FIG. 10. When the cumulative value of the luminance values is not less than the judgment threshold (step S13: NO), the controller 10 ends the procedures of the flowchart in FIG. 10 without judging that the predetermined region is a low-frequency region. When the cumulative value of the luminance values is equal to or greater than the judgment threshold, the controller 10 may judge that the predetermined region is a high-frequency region. The controller 10 may judge that the predetermined region is a region having a predetermined spatial frequency spectrum by appropriately setting the judgment threshold or combining a plurality of judgment thresholds.

If the controller 10 were to analyze the spatial frequency of the captured image 110 to detect a low-frequency region, the computational load for analyzing the spatial frequency could become extremely large. On the other hand, the detection apparatus 1 according to the present embodiment can detect a low-frequency region from the captured image 110 only by generating the smoothed image and the difference image 140. Since the spatial frequency is not analyzed, a low-frequency region of the image can therefore be detected with a relatively small load.

At least a portion of the low-frequency region detected from the captured image 110 may include a foreign substance adherence region such as the third region 113 of FIG. 6. The position, shape, or size of the low-frequency region changes in accordance with a change in the subject image. On the other hand, the position, shape, or size of the foreign substance adherence region tends not to change regardless of a change in the subject image, as long as the foreign substance adhered to the imaging optical system 22 does not move.

While the controller 10 is detecting a pedestrian, another moveable body, or the like from the captured image 110 as a monitored object, the monitored object may enter into the foreign substance adherence region. The controller 10 might not be able to detect the monitored object from the captured image 110 when the monitored object enters the foreign substance adherence region and consequently may not be able to continue monitoring. When a monitored object that was being detected ceases to be detected from the captured image 110, the controller 10 may infer that the monitored object is present in the foreign substance adherence region. The controller 10 may overlay display content indicating the inferred presence of the monitored object on the captured image 110 and output the result to the display 18 when the presence of the monitored object is inferred despite the monitored object not being detected. The foreign substance adherence region detected from the captured image 110 is thus reflected in the detection of the monitored object, making the monitored object less likely to be overlooked even when the monitored object is no longer detected from the captured image 110.

To judge a foreign substance adherence region from a low-frequency region, the controller 10 may unconditionally designate a low-frequency region as a foreign substance adherence region. A monitored object is then less likely to be overlooked. The controller 10 may instead determine the foreign substance adherence region from a low-frequency region using the procedures in the flowchart of FIG. 12. Steps S21 to S23 of FIG. 12 are the same or similar procedures as steps S1 to S3 of FIG. 7.

When the controller 10 detects a low-frequency region in step S23, the region detected as a low-frequency region is stored in the memory 12 (step S24). The controller 10 may store the region detected as a low-frequency region in a storage device provided in the controller 10.

Figure 12:
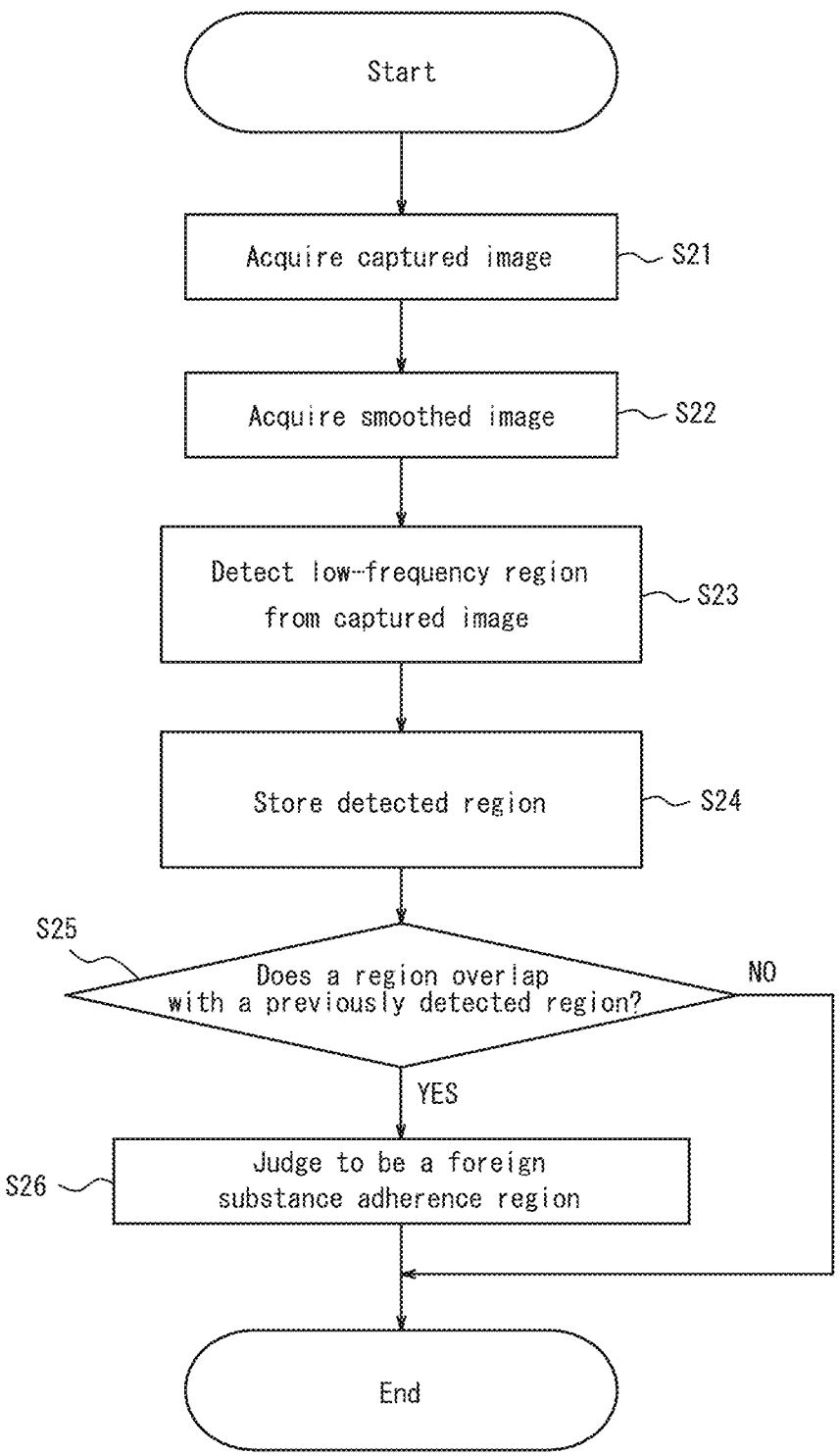
FIG. 12 is a flowchart illustrating an example of procedures for judging adhesion of a foreign substance.

When a region was detected in step S23 the previous time the procedures of the flowchart in FIG. 12 were executed, the controller 10 acquires the previously detected region from the memory 12. The controller 10 judges whether there is an overlapping region between the previously detected region and the currently detected region (step S25). In other words, the controller 10 performs the detection in step S23 at least twice, i.e. the previous detection and the current detection, and judges whether the low-frequency region detected at least twice in a row includes an overlapping region.

When an overlapping region is included (step S25: YES), the controller 10 judges that the detected overlapping region is a foreign substance adherence region (step S26). The controller 10 thus judges that when an overlapping region is included in a low-frequency region detected at least twice in a row, the overlapping region is a foreign substance adherence region. After step S26, the controller 10 ends the procedures of the flowchart in FIG. 12. The controller 10 may return to step S21 after step S26. The controller 10 ends the procedures of the flowchart in FIG. 12 when no overlapping region is included (step S25: NO). The controller 10 may return to step S21.

As a result of this condition of the same region being detected at least twice in a row as a low-frequency region, a region that frequently moves within the captured image 110 and in which the luminance tends not to change, such as the wall of a building, is less likely to be judged to be a foreign substance adherence region. In other words, the detection accuracy of the foreign substance adherence region can improve.

Figure 13:
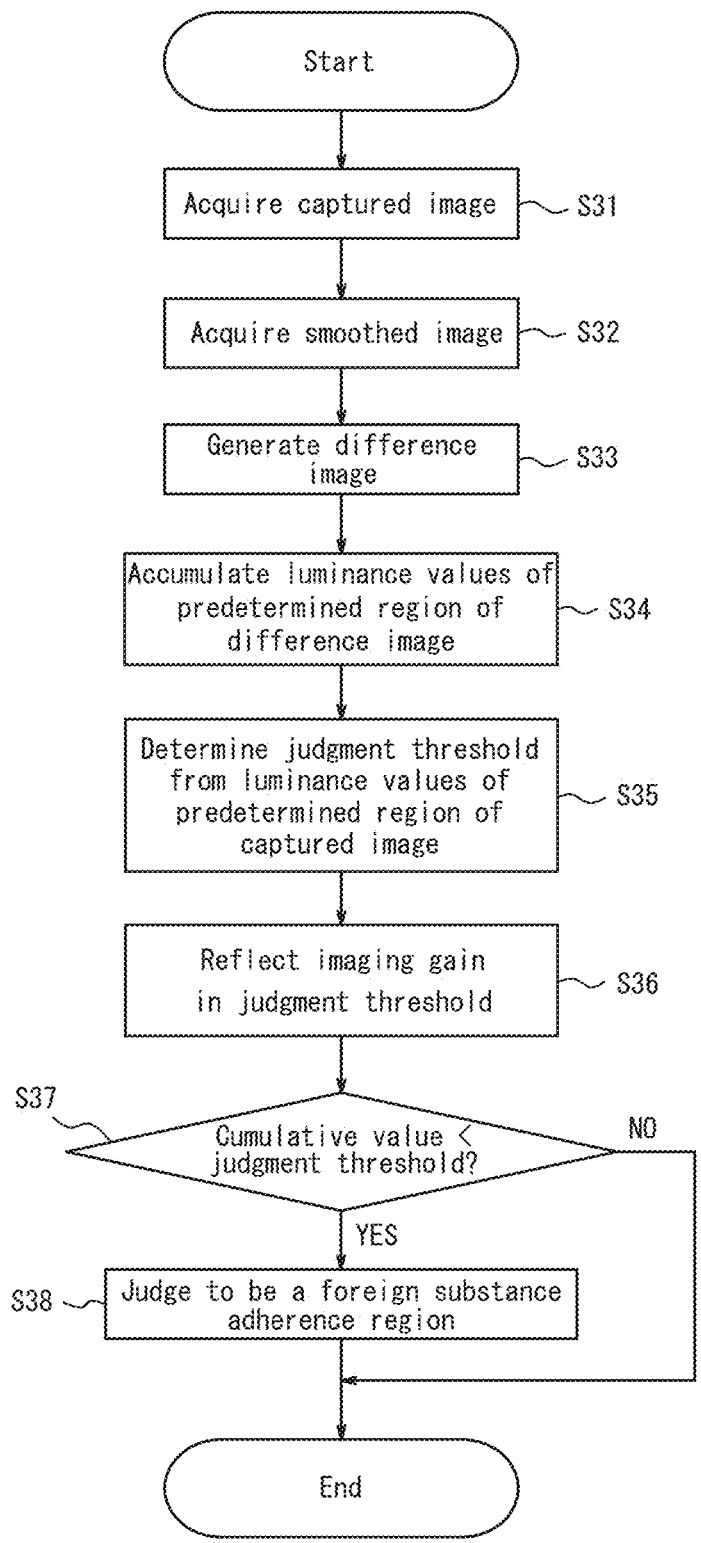
FIG. 13 is a flowchart illustrating an example of procedures using a judgment threshold.

The judgment threshold used to judge whether a predetermined region is a low-frequency region in the procedures of the flowchart in FIG. 10 can be determined by several methods. The judgment threshold may, for example, be determined on the basis of the luminance values of the captured image 110. The controller 10 may, for example, determine the judgment threshold and judge the low-frequency region using the procedures of the flowchart in FIG. 13. Steps S31 to S34 of FIG. 13 are the same or similar procedures as steps S11 to S14 of FIG. 10.

The controller 10 determines the judgment threshold from the luminance value of the pixels included in a predetermined region of the captured image 110 corresponding to a predetermined region of the difference image 140 (step S35). The controller 10 may, for example, calculate the sum of the luminance value of the pixels included in a predetermined region of the captured image 110, multiply the sum by a predetermined coefficient, and designate the result as the judgment threshold. The controller 10 can determine the judgment threshold using Equation (1) below, where the coordinates of each pixel inside the predetermined region are represented as (i, j) and the luminance value of each pixel in the predetermined region is represented as I(i, j).

$$\text{(judgment threshold)} = \text{(predetermined coefficient)} \times \Sigma_{(i,j)} I \quad (1)$$

The predetermined coefficient can be determined appropriately within a range from greater than zero to less than one. The same value may be used for the entire captured image 110, or a different value may be used for each predetermined region. The predetermined coefficient may be set to a relatively high value when a high-contrast subject image is expected, such as for images captured outside in daylight, and may be set to a relatively low value when a low-contrast subject image is expected. The predetermined coefficient may be set to a small value to prevent a high-frequency region from mistakenly being judged to be a low-frequency region. The predetermined coefficient may be set to a large value to prevent a low-frequency region from mistakenly being judged to be a high-frequency region.

The controller 10 may calculate the maximum luminance value of the pixels included in a predetermined region of the captured image 110, multiply the maximum by a predetermined coefficient and by the number of pixels in the predetermined region, and designate the result as the judgment threshold. The controller 10 may determine the judgment threshold by a different calculation, such as calculating the sum or maximum of the luminance value of the pixels included in a predetermined region of the captured image 110. Determining the judgment threshold from the luminance value of the pixels included in a predetermined region of the captured image 110 makes a relatively low-luminance region in which the luminance tends not to change, such as the road 50, less likely to be judged to be a foreign substance adherence region. In other words, the detection accuracy of the foreign substance adherence region can improve. Instead of calculating the judgment threshold, the controller 10 may use a predetermined value as the judgment threshold.

The controller 10 reflects the imaging gain of the image sensor 24 in the judgment threshold (step S36). The controller 10 may set the judgment threshold to the product of the judgment threshold determined in step S35 and the imaging gain. The imaging gain of the image sensor 24 changes in accordance with a change in the amount of light incident on the image sensor 24. For example, the imaging gain of the image sensor 24 may increase when a small amount of light is incident on the image sensor 24. When the imaging gain of the image sensor 24 is large, a relatively large noise component may be included in the captured image 110 output by the image sensor 24. The change in luminance value in an image that includes a noise component becomes relatively large. When the imaging gain of the image sensor 24 is not reflected in the judgment threshold, it may become difficult to judge the foreign substance adherence region due to the effect of the noise component. In other words, reflecting the imaging gain of the image sensor 24 in the judgment threshold can reduce the effect of the noise component on judgment.

The controller 10 may set the judgment threshold to the product of the imaging gain and the judgment threshold determined on the basis of the average of luminance values in step S35. The controller 10 may set the judgment threshold to the product of the imaging gain and the judgment threshold determined on the basis of the maximum luminance value in step S35. The controller 10 may set the judgment threshold to the product of the imaging gain and the judgment threshold set to a predetermined value in step S35.

The controller 10 judges whether the cumulative value of the luminance value of the pixels included in the predetermined region of the difference image 140 is less than the judgment threshold (step S37). When the cumulative value of the luminance values is less than the judgment threshold (step S37: YES), the controller 10 judges that the predetermined region is a foreign substance adherence region (step S38). After step S38, the controller 10 ends the procedures of the flowchart in FIG. 13. When the cumulative value of the luminance values is not less than the judgment threshold (step S37: NO), the controller 10 ends the procedures of the flowchart in FIG. 13 without judging that the predetermined region is a foreign substance adherence region.

When a foreign substance adherence region is detected from the captured image 110, the controller 10 may output an image in which display content indicating the foreign substance adherence region is overlaid on the captured image 110 to the display 18. The controller 10 may cause the notification interface 16 to provide notification that the foreign substance adherence region was detected from the captured image 110. This can encourage the user to confirm the adherence of a foreign substance to the imaging unit 20.

When the foreign substance adherence region is detected from the captured image 110, then during detection of a monitored object, such as a pedestrian or another moveable body, the controller 10 may infer that the monitored object is located within the foreign substance adherence region. The controller 10 may overlay display content indicating the region where the monitored object is inferred to be on the captured image 110 and output the result to the display 18. The user is thus less likely to overlook the monitored object.

In the procedures of the flowchart in FIG. 10, the controller 10 judges whether a predetermined region is a low-frequency region. The controller 10 may instead divide the captured image 110, the smoothed image 130, or the difference image 140 into blocks and judge whether each block is a low-frequency region.

Figure 14:
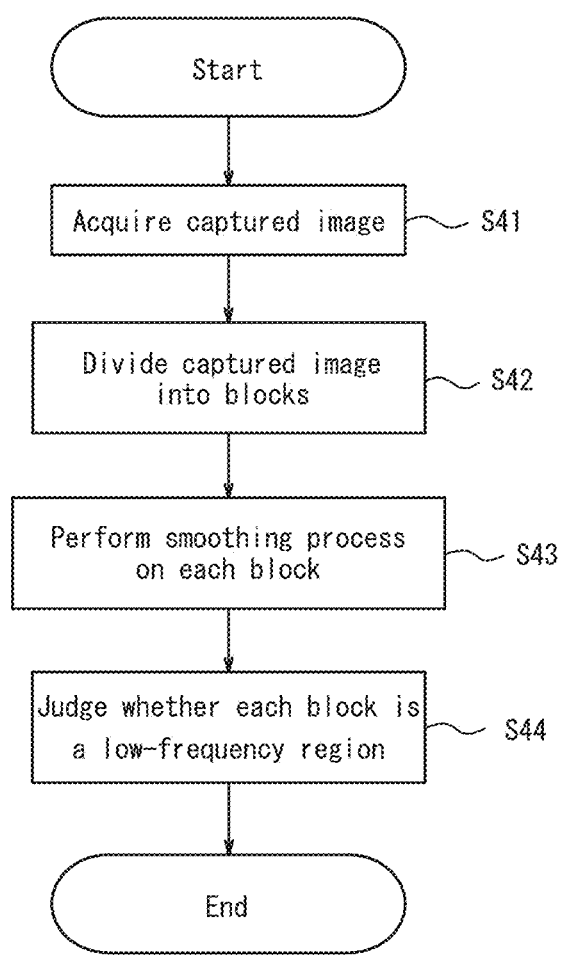
FIG. 14 is a flowchart illustrating an example of procedures for dividing a captured image into blocks and judging.

For example, the controller 10 divides the captured image 110 into blocks and judges whether each block is a low-frequency region using the procedures of the flowchart in FIG. 14. The procedure in step S41 of FIG. 14 is the same as or similar to step S1 of FIG. 7.

The controller 10 divides the captured image 110 into a plurality of blocks (step S42). The blocks may be regions of a predetermined size. The blocks may be the same or different from each other in size or shape. The shape of each block may, for example, be a rectangle, triangle, another polygon, or any other shape. The blocks divided up from the captured image 110 are also referred to as captured image blocks.

The controller 10 acquires smoothed image blocks yielded by smoothing the captured image blocks (step S43). The procedure for smoothing is the same or similar to the procedure performed in step S2 of FIG. 7.

The controller 10 sequentially judges each block by comparing the captured image block and the smoothed image block and judging whether the captured image block is a low-frequency region (step S44). The controller 10 may, for example, judge that a region with a small difference between the captured image block and the smoothed image block is a low-frequency region. As in steps S11 to S14 of FIG. 10, the controller 10 may judge whether a block is a low-frequency region on the basis of the cumulative value of the luminance values in the difference between the captured image block and the smoothed image block. The blocks to be judged may be all or a portion of the divided-up blocks. The controller 10 may judge whether each block among at least a portion of the blocks is a foreign substance adherence region using procedures similar to those of steps S24 to S26 of FIG. 12. After step S44, the controller 10 ends the procedures of the flowchart in FIG. 14.

Figure 15:
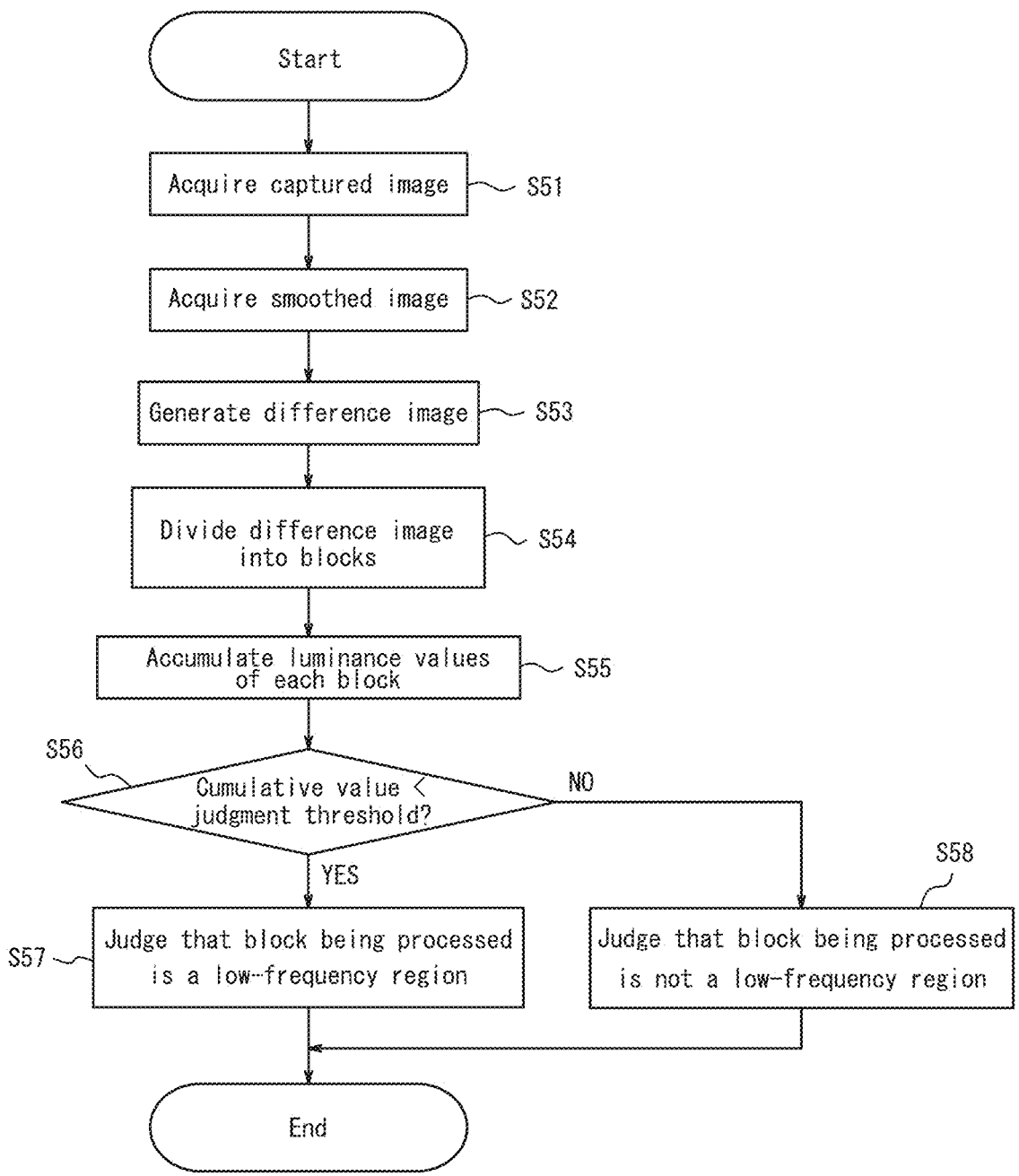
FIG. 15 is a flowchart illustrating an example of procedures for dividing a difference image into blocks and judging.

For example, the controller 10 may divide the difference image 140 into blocks and judge whether each block is a low-frequency region using the procedures of the flowchart in FIG. 15. Steps S51 to S53 of FIG. 15 are the same or similar procedures as steps S11 to S13 of FIG. 10.

The controller 10 divides the difference image 140 into a plurality of blocks (step S54). The blocks may be similar to those described in step S42 of FIG. 14. The blocks divided up from the difference image 140 are also referred to as difference image blocks.

The controller 10 accumulates the luminance value of the pixels included in the difference image blocks (step S55).

The controller 10 sequentially judges each block by judging whether the cumulative value of the luminance values is less than a judgment threshold (step S56). The judgment threshold may be determined appropriately. The judgment threshold may be determined in a similar way to the procedures of step S35 or step S36 of FIG. 13. The blocks to be judged may be all or a portion of the divided-up blocks.

When the cumulative value of the luminance values is less than the judgment threshold (step S56: YES), the controller 10 judges that the block being processed is a low-frequency region (step S57). After step S57, the controller 10 ends the procedures of the flowchart in FIG. 15. When the cumulative value of the luminance values is not less than the judgment threshold (step S56: NO), the controller 10 judges that the block being processed is not a low-frequency region (step S58). After step S58, the controller 10 ends the procedures of the flowchart in FIG. 15. The controller 10 may judge whether each block among at least a portion of the blocks is a foreign substance adherence region by performing procedures similar to those of steps S34 to S38 of FIG. 13.

Other information detected on the basis of the captured image 110 may be detected from each captured image block. A low-frequency region or foreign substance adherence region detected from an image divided up into blocks is more easily associated with other information detected from the captured image block. Dividing the image up into blocks can allow the low-frequency region or foreign substance adherence region to be detected more efficiently and more accurately.

Structures according to the present disclosure are not limited to the above embodiments, and a variety of modifications and changes are possible. For example, the functions and the like included in the various components may be reordered in any logically consistent way. Furthermore, components may be combined into one or divided.

The invention claimed is:

1. A detection apparatus comprising:
an image acquisition interface configured to acquire a captured image captured by an imaging unit and
a controller configured to
generate or acquire a smoothed image yielded by smoothing the captured image;
compare the captured image and the smoothed image;
detect a low-frequency region having a predetermined spatial frequency spectrum from the captured image;
generate a difference image of the captured image and the smoothed image;
calculate a cumulative value of luminance values of each pixel included in a predetermined region of the difference image; and
detect the low-frequency region having the predetermined spatial frequency spectrum from a predetermined region of the captured image corresponding to the predetermined region of the difference image when the cumulative value is less than a judgment threshold.

2. The detection apparatus of claim 1, wherein in the predetermined spatial frequency spectrum, an intensity of a frequency component, the frequency component being greater (higher) than or equal to a predetermined frequency, is less than a predetermined intensity.

3. The detection apparatus of claim 1, wherein the controller is further configured to detect the low-frequency region as a foreign substance adherence region affected by a foreign substance adhered to the imaging unit.

4. The detection apparatus of claim 1, wherein the controller is configured to
detect, at least twice, whether the captured image has the predetermined spatial frequency spectrum, and
detect an overlapping region as a foreign substance adherence region affected by a foreign substance adhered to the imaging unit when the low-frequency region is detected at least twice in a row and includes the overlapping region.

5. The detection apparatus of claim 1, wherein the judgment threshold is determined in accordance with the luminance values of each pixel included in a predetermined region of the captured image.

6. The detection apparatus of claim 1, wherein the judgment threshold is determined in accordance with an imaging gain of the imaging unit when the captured image was captured.

7. The detection apparatus of claim 1, wherein the controller is configured to detect the low-frequency region from the captured image by dividing the captured image into a plurality of blocks, generating or acquiring smoothed images yielded by smoothing the plurality of blocks, and judging whether each of the plurality of blocks is the low-frequency region.

8. The detection apparatus of claim 1, wherein the controller is configured to detect the low-frequency region from the captured image by dividing the difference image into a plurality of blocks and judging whether each of the plurality of blocks is the low-frequency region.

9. An imaging apparatus comprising:
an imaging unit that includes
an imaging optical system and an image sensor configured to perform photoelectric conversion on a subject image formed by the imaging optical system;
an image acquisition interface configured to acquire a captured image from the image sensor; and
a controller configured to:
generate or acquire a smoothed image yielded by smoothing the captured image;
compare the captured image and the smoothed image and to detect a low-frequency region having a predetermined spatial frequency spectrum from the captured image;
generate a difference image of the captured image and the smoothed image;
calculate a cumulative value of luminance values of each pixel included in a predetermined region of the difference image; and
detect the low-frequency region having the predetermined spatial frequency spectrum from a predetermined region of the captured image corresponding to the predetermined region of the difference image when the cumulative value is less than a judgment threshold.

10. A moveable body comprising the imaging apparatus of claim 9.

11. A detection method comprising:
acquiring a captured image captured by an imaging unit;
generating or acquiring a smoothed image yielded by smoothing the captured image;
detecting a low-frequency region having a predetermined spatial frequency spectrum from the captured image by comparing the captured image and the smoothed image;
generating a difference image of the captured image and the smoothed image;
calculating a cumulative value of luminance values of each pixel included in a predetermined region of the difference image; and
detecting the low-frequency region having the predetermined spatial frequency spectrum from a predetermined region of the captured image corresponding to the predetermined region of the difference image when the cumulative value is less than a judgment threshold.

12. The detection apparatus of claim 2, wherein the controller is further configured to detect the low-frequency region as a foreign substance adherence region affected by a foreign substance adhered to the imaging unit.

13. The detection apparatus of claim 2, wherein the controller is configured to detect, at least twice, whether the captured image has the predetermined spatial frequency spectrum, and detect an overlapping region as a foreign substance adherence region affected by a foreign substance adhered to the imaging unit when the low-frequency region is detected at least twice in a row and includes the overlapping region.

* * * * *